United States Patent [19]

Conde-Petit et al.

[11] Patent Number: 5,291,877
[45] Date of Patent: Mar. 8, 1994

[54] LOW STARCH CONCENTRATION GEL AND PREPARATION THEREOF

[75] Inventors: Beatrice Conde-Petit; Felix Escher, both of Zurich, Switzerland

[73] Assignee: Nestec S.A., Vevey, Switzerland

[21] Appl. No.: 887,078

[22] Filed: May 21, 1992

[30] Foreign Application Priority Data

Jun. 21, 1991 [EP] European Pat. Off. ........ 91110137.6

[51] Int. Cl.$^5$ .................. C08B 30/12; A23L 1/05; A23L 1/187
[52] U.S. Cl. ........................... 127/33; 127/67; 127/71; 426/578; 426/579; 426/661
[58] Field of Search ............. 127/33, 67, 71; 106/211, 213, 210; 426/578, 579, 661

[56] References Cited

U.S. PATENT DOCUMENTS

| | | | |
|---|---|---|---|
| 2,328,537 | 8/1940 | Felton et al. | 127/33 |
| 2,749,244 | 6/1956 | Winner | 99/139 |
| 3,443,990 | 5/1969 | Decnop | 127/33 |
| 3,669,687 | 6/1972 | D'Ercole | 426/579 |
| 3,754,935 | 8/1973 | Glicksman et al. | 99/139 |
| 3,917,875 | 11/1975 | Gardiner | 426/573 |
| 4,215,152 | 7/1980 | O'Rourke | 426/661 |
| 4,260,642 | 4/1981 | Mitchell et al. | 127/71 |
| 4,262,031 | 4/1981 | Carpenter et al. | 426/528 |
| 4,362,755 | 12/1982 | Mitchell et al. | 426/579 |
| 4,418,090 | 11/1983 | Bohrmann et al. | 426/578 |
| 4,491,483 | 1/1985 | Dudacek et al. | 127/33 |
| 4,508,576 | 4/1985 | Mudde | 106/213 |
| 4,575,395 | 3/1986 | Rudin | 127/32 |
| 5,100,475 | 3/1992 | Würsch et al. | 127/67 |

FOREIGN PATENT DOCUMENTS

0011479A1 5/1980 European Pat. Off.
WO8909793 10/1989 PCT Int'l Appl.

Primary Examiner—R. Bruce Breneman
Assistant Examiner—Patricia L. Harley
Attorney, Agent, or Firm—Vogt & O'Donnell

[57] ABSTRACT

A gel having a low concentration of starch and a short texture, distinguished by its elasticity as opposed to its viscosity, is prepared by treating a gelatinized starch in an aqueous mixture with an emulsifier suitable for forming an amylose-emulsifier inclusion complex and then cooling to gel the mixture, or by simultaneously, in aqueous mixture, gelatinizing a native starch and complexing amylose released from the starch with an emulsifier suitable for forming an amylose-emulsifier inclusion complex and then cooling to gel the mixture. The gel has a conservation modulus from 5 $Nm^{-2}$ to 50 $Nm^{-2}$ and a dissipation modulus of from 1 $Nm^{-2}$ to 10 $Nm^{-2}$.

23 Claims, No Drawings

LOW STARCH CONCENTRATION GEL AND PREPARATION THEREOF

BACKGROUND OF THE INVENTION

This invention relates to a process for the production of a gel, more particularly a food gel, and to the gel obtained by this process.

There are various known processes for modifying starches in which the starches are complexed with an emulsifier, for example to improve their dispersibility or their thickening power.

Thus, U.S. Pat. No. 4,491,483 (Dudacek et al.) describes a starch readily dispersible in boiling water which is obtained by treatment of a native starch at 50° to 120° C. in the presence of 10 to 40% water and at least 0.25%, based on the weight of the starch, of an emulsifier, and drying, the precise conditions of this treatment by exposure to moisture and heat being selected to avoid gelatinization of the starch. The effect of this treatment is to increase the gelatinization temperature of the starch and thus to avoid the formation of lumps when the starch is dispersed in boiling water.

French Patent No. 2 629 684 (INRA) relates to a amylaceous product readily dispersible both in cold and in hot or boiling water which is obtained by microwave treatment of a medium containing a native starch, 30 to 50% water and, optionally, at most 3%, based on the weight of the starch, of an amylose-complexing agent, granulation of the paste thus obtained and drying. The microwave treatment is carried out for 30 s to 15 mins. at 50° to 98° C. until at least 50% of the starch has gelatinized. The amylaceous material thus obtained may be used for its binding properties in the preparation of cooked dishes, cold meats and sauces for example.

European Patent Application Publication No. EP 011 479 (General Foods) describes a process for the production of a pregelatinized modified starch suitable for use in the preparation of instant puddings, in which sodium or calcium stearoyl lactyl-2-lactate and/or a combination of a protein and an emulsifier is added to an aqueous dispersion of native starch and in which either a dispersion is heated and directly dried on rollers to a dry matter content of 20 to 40% or a dispersion is heated in a scraped-surface heat exchanger to a dry matter content of less than 10%, for example 7.2%, and is then spray-dried.

In a variant of the process according to European Patent Application Publication No. 011 479 in which a roller dryer is used, the rollers are heated with steam under a pressure of 3 to 11 bar and are rotated at a speed of a few revolutions per minute. In the variant where a scraped surface heat exchanger is used, the dispersion is preferably preheated to just below the gelatinization temperature of the starch, for example to 65°-70° C. for tapioca, to increase this gelatinization temperature, and is then heated at 80° to 90° C. for a sufficient time to completely gelatinize the starch.

The embodiment of the process according to EP 011 479, in which only sodium or calcium stearoyl lactyl-2-lactate is added, gives a pregelatinized modified starch which has the same thickening effect as an unmodified pregelatinized starch. The actual modification provides the reconstituted pudding with a softer and creamier texture and with a brighter appearance.

There are also various powders for food gels of the instant dessert type or the cooked pudding type which contain starch as a thickener and an emulsifier to smooth the texture of the reconstituted dessert.

Thus, U.S. Pat. No. 3,917,875 (Gardiner) describes a powder for an instant dessert of the yoghurt type which contains sugar, gelatine, a stabilizer, such as a gum, a food acid, pregelatinized starch and, optionally, an emulsifier and/or colouring and flavouring agents.

Similarly, U.S. Pat. No. 4,262,031 (Carpenter et al.) describes a powder for a pudding intended for cooking which contains sugar, non-gelatinized starch, more particularly native cornstarch, highly alkalized cocoa powder, an acidifier and, optionally, an emulsifier and/or a stabilizer, such as a gum.

SUMMARY OF THE INVENTION

The object of the present invention is to provide a gel, more particularly a food gel, containing a low concentration of starch complexed with an emulsifier which would have a particularly short texture, i.e., would be distinguished by its elasticity as opposed to its viscosity.

Another object of the invention is to provide a process for the production of this gel from an aqueous solution having a low concentration of starch.

To this end, the gel according to the present invention contains starch having a significant content of amylose complexed with an emulsifier capable of complexing amylose and has a conservation modulus G' of 5 to 50 $Nm^{-2}$ and a dissipation modulus G" of 1 to 10 $Nm^{-2}$.

Similarly, in the process according to the invention for the production of this gel, an aqueous mixture containing all the ingredients entering into the composition of the gel, including the emulsifier in dispersed form and the starch in gelatinized form, is prepared under conditions which enable a useful quantity of amylose to be released, the amylose released is complexed with the emulsifier by heating and the mixture is set by cooling.

It has been found that it is effectively possible in this way to produce gels which have a low concentration of starch and a remarkable texture due to an increase in their elasticity relative to their viscosity through complexing of the amylose released with an emulsifier.

More particularly, it has been found that the formation of these gels is attributable to complexing by inclusion of emulsifier molecules in amylose molecules which assume a helical configuration. This type of complexing is described, for example, by M. A. Rutschmann in his thesis published in 1987 at L'Ecole Polytechnique Fédérale, Zurich, under No. 8413.

DETAILED DESCRIPTION OF THE INVENTION

In the present specification, the texture of the gels is defined by the parameters "conservation modulus" G' which characterizes the elasticity of the gel and "dissipation modulus" G" which characterizes its viscosity. These parameters are determined by harmonic analysis. The sample is subjected to sinusoidal stress or deformation at a certain frequency as a function of time. The corresponding shear stress is measured; it is also sinusoidal, but has a phase shift between the extremes of zero (purely elastic texture) and $\pi/2$ (purely viscous texture). An intermediate phase shift has an elastic component, namely the conservation modulus G', and a viscous component, namely the dissipation modulus G". In the context of the present specification, these moduli are determined with a rheometer at constant voltage using a measuring instrument consisting of a cone rotating on a plate, the cone and the plate both being 6 cm in diameter and the angle between the cone and the plate being 2°. The measurements are carried out at 25° C. at an oscillation frequency of the cone around its axis of 2 Hz under a couple situated in a linear viscoelasticity range of from about 0.01 to 0.1 Nm.

The iodine binding power is determined by amperometric titration of iodine using the method described by R. Wyler in his thesis published in 1979 at L'Ecole Polytechnique Fédérale, Zurich, under No. 6514.

The measurements are carried out at a polarization voltage and current of 140 mV and 2 mA, respectively, at ambient temperature on 15 ml samples of 0.01N iodine/potassium titration solution and at a dropwise addition rate of 0.4 ml/min. The iodine binding power is defined as the quotient of the quantity of iodine bound over the total quantity of starch multiplied by 100.

The degree of complexing is defined as the quotient of the difference between the iodine binding power of the starch and the iodine binding power of the complex over the iodine binding power of the starch multiplied by 100.

The expression "low concentration of starch" means having a low starch content, i.e. a starch content of from about 1 to a few % by weight. Since a native starch generally has a certain water content, for example approximately 7 to 15%, "% by weight starch" is to be understood here to mean % by weight starch dry matter.

Thus, the gel according to the invention preferably contains, for example, 1 to 5% by weight starch and 1 to 8%, based on the weight of the starch, of the emulsifier.

The starch should have a significant amylose content. This means that a starch known to consist almost exclusively of amylopectin, such as for example the starch known in English as "waxy maize" (waxy starch, 1% amylose), would not be suitable. However, this does not mean that the starch selected has to be exceptionally rich in amylose, such as for example the starch known in English "amylomaize" (50 to 70% amylose), which might not be suitable either.

Starches particularly suitable for the purposes of the present invention are potato starch, tapioca starch, ordinary cornstarch and/or wheat starch, which have a "significant" amylose content of from about 15 to 30% by weight.

The emulsifier must be capable of forming a complex with amylose. Thus, lecithin for example is not suitable. By contrast, glycerol monostearate, calcium stearoyl lactyl-2-lactate, sodium stearoyl lactyl-2-lactate, polyoxyethylene sorbitan monostearate and/or polyethylene glycol monolaurate, for example, are particularly suitable.

The present invention provides gels intended for the various branches of industry interested in this type of product, for example the food industry, the cosmetic industry and the paint and varnish industry.

In one preferred embodiment of the invention, the gel is a food gel and, in addition to the complexed starch, may contain, in particular, the ingredients traditionally used in desserts of the pudding type, such as for example milk solids, sucrose and flavouring and/or colouring materials and/or agents.

The process according to the invention is carried out by preparing an aqueous solution containing all the ingredients entering into the composition of the gel, namely the starch, the emulsifier in dispersion and, optionally, other additional ingredients such as, for example, those mentioned above for the particular embodiment of the pudding type.

The solution may be prepared by adding the starch, for example, in native pregelatinized form or pretreated by exposure to heat and moisture. It is pointed out in this regard that the conditions under which the starch is gelatinized may be more critical, the lower the starch concentration of the aqueous mixture.

Below about 2% by weight, for example, it is recommended to gelatinize the starch under conditions which enable the starch granules to remain intact while allowing a useful quantity of amylose to be released, i.e., a quantity sufficient to obtain a gel having the required texture. To this end, the starch may be gelatinized, for example, for 2 to 30 minutes at 90° to 98° C. with gentle stirring. If the starch is gelatinized below 90° C., there is a risk that the quantity of amylose released from the starch granules may be too small. If the starch is gelatinized at a temperature above 98° C., the granules are in danger of bursting.

If, by contrast, the starch is gelatinized under conditions where there is a considerable probability of almost all the granules bursting, it is recommended to adjust the starch concentration of the aqueous mixture to at least approximately 3% by weight. This probability exists in particular when the starch is gelatinized under conditions equivalent to a sterilizing treatment, for example at temperatures as high as 125° C.

In other words, when the gelatinization temperature increases beyond 98° C., it is recommended to counteract the probability of the granules bursting by increasing the starch concentration of the aqueous mixture beyond 2%, for example to concentrations of at least about 3% under sterilization conditions.

At all events, the starch is preferably gelatinized under conditions which enable amylose to be released in such a quantity that the starch has an iodine binding power of approximately 3.3 to 4.7%.

The emulsifier is added to the aqueous mixture so that it is present in dispersed form therein. This is necessary to ensure that the emulsifier is available to complex the starch or, more precisely, the amylose released. The emulsifier is preferably added to the aqueous mixture to obtain a degree of complexing of the starch with the emulsifier of approximately 90 to 100%.

To this end, either the emulsifier may be dispersed beforehand in a little water and the resulting dispersion added to the mixture or the emulsifier may be directly dispersed in the mixture, for example at a suitable pH and at a suitable temperature. The suitable pH and temperature conditions for dispersing an emulsifier in water are characteristic of each emulsifier and are either known to or may be determined by the expert. For example, calcium stearoyl lactyl-2-lactate can be dispersed in water at pH 6–12/45°–55° C., glycerol monostearate at pH 6.7/66°–68° C. and polyoxyethylene sorbitan monostearate at pH 5–12/15°–80° C.

The emulsifier may be added to the mixture as described above before, during or after gelatinization of the starch. The emulsifier may even be added to the starch, more particularly by coating an optionally pregelatinized starch, and the whole added to the mixture.

The amylose released from the granules is complexed with the emulsifier by heating. As mentioned above, the amylose is preferably complexed with the emulsifier so that the starch has a degree of complexing of approximately 90 to 100%. To this end, complexing may be carried out, for example, for 15 s to 30 mins. at 70° to 125° C.

EXAMPLES

The following Examples are intended to illustrate the gel according to the invention and the process for its production. In the Examples, percentages and parts are by weight unless otherwise indicated.

EXAMPLE 1

An aqueous mixture containing the following ingredients in the proportions indicated in % is prepared:

| | |
|---|---|
| Whole milk | 90.46 |
| Vanilla-flavoured sucrose | 6.67 |
| Native potato starch containing 85% dry matter and 23% amylose | 3.67 |
| Yellow food colouring | 0.13 |
| Calcium stearoyl lactyl-2-lactate | 0.07 |

The emulsifier was dispersed beforehand in part of the milk at pH 6.0/45° C. and was then added to the mixture.

The temperature of the mixture was increased to 95° C. while stirring. The temperature was kept at 95° C. for 20 to 30 minutes with stirring.

During this operation, the starch was gelatinized and the amylose released was complexed at the same time. The conditions under which this operation is carried out on the one hand enable amylose to be released in such a quantity that the starch has an iodine binding power of 3.63% and, on the other hand, enable the amylose to be complexed with the emulsifier so that the starch has a degree of complexing of 100%.

The mixture is set by cooling at 5° C. without stirring. The food gel, in other words the vanilla-flavoured pudding obtained, has a conservation modulus G' of 22 Nm$^{-2}$, a dissipation modulus G" of 5 Nm$^{-2}$ and a pH of 6.5. It is distinguished by a texture in the mouth which is both melting and crispy, but in no way sticky, i.e., by a semi-solid, short texture.

By way of comparison, a vanilla pudding prepared in the same way, but with no addition of emulsifier, has a long, fluid texture, a conservation modulus G' of 3.2 Nm$^{-2}$ and a dissipation modulus G" of 3.4 Nm$^{-2}$.

EXAMPLE 2

An aqueous mixture containing the following ingredients in the proportions indicated in % is prepared:

| | |
|---|---|
| Water | 80.22 |
| Cream containing 35% fats | 7.89 |
| Sucrose | 6.67 |
| Potato starch containing 88.5% dry matter and 23% amylose, treated with steam and moisture* | 2.76 |
| Skimmed milk powder | 2.10 |
| Glycerol monostearate | 0.05 |
| Calcium stearoyl lactyl-2-lactate | 0.05 |
| Yellow food colouring | 0.13 |
| Vanilla extract | 0.13 |

*The starch was moistened to a 20% water content, treated for 4 h at 95° C. in a sealed container, dried in air and ground.

The emulsifiers were separately dispersed beforehand in 1 part of water at pH 6.5/67° C. for the glycerol monostearate and in 1 part water at pH 6.0/45° C. for the calcium stearoyl lactyl-2-lactate. They were then added to the mixture.

The mixture is introduced into lacquered 0.5 liter tin cans which are then sealed. The cans are placed in an autoclave rotating at 0.2 r.p.m. and are left therein for 30 minutes at 121° C., the temperature of the solution rising from 25° to 121° C. in the first 10 minutes.

During this operation, the starch is gelatinized and the amylose released is complexed at the same time. The conditions under which this operation is carried out on the one hand enable amylose to be released in such a quantity that the starch has an iodine binding power of 4.32% and, on the other hand, enable the amylose to be complexed with the emulsifier so that the starch has a degree of complexing of 100%.

The mixture is set by cooling with cold water in the autoclave to a temperature of 25° C. This operation takes about 30 minutes. The rotation of the autoclave is stopped 10 minutes after the beginning of cooling.

The food gel, i.e., the sterilized vanilla pudding obtained, has a conservation modulus G' of 20 Nm$^{-2}$, a dissipation modulus G" of 5 Nm$^{-2}$ and a pH of 6.5. It is distinguished by a short, semisolid texture.

By comparison, a vanilla pudding sterilized in the same way, but with no addition of emulsifier, has a long and fluid texture, a conservation modulus G' of 1.5 Nm$^{-2}$ and a dissipation modulus G" of 1.6 Nm$^{-2}$.

EXAMPLE 3

An aqueous mixture containing the following ingredients in the proportions indicated in % is prepared:

| | |
|---|---|
| Commercial pregelatinized potato starch containing 93% dry matter and 23% amylose | 2.88 |
| Calcium stearoyl lactyl-2-lactate coating the starch* | 0.12 |
| Sucrose | 6.0 |
| Vanilla-flavoured sucrose | 2.0 |
| Cocoa powder | 4.0 |
| Skimmed milk powder | 10.0 |
| Water | 75.0 |

*The pregelatinized starch was coated by spraying with an alcoholic solution of the emulsifier and drying in air at 40° C.

The conditions under which the starch was gelatinized enabled amylose to be released in such a quantity that the starch had an iodine binding power of 4.65%.

To prepare the mixture, the dry ingredients are dispersed gently in water. The mixture is then heated to 98° C. while stirring. The temperature is kept at 98° C. for 5 minutes with gentle stirring.

During this operation, the amylose is complexed so that the starch has a degree of complexing of 100%.

The mixture is set by cooling to 5° C. without stirring. The food gel, in other words the chocolate pudding obtained, has a conservation modulus G' of 30 Nm$^{-2}$, a dissipation modulus G" of 8 Nm$^{-2}$ and a pH value of 6.6. It is distinguished by a particularly short, semisolid texture.

For comparison, a chocolate pudding obtained in the same way, but with no addition of emulsifier, has a long and less firm texture, a conservation modulus G' of 1.4 Nm$^{-2}$ and a dissipation modulus G" of 3.1 Nm$^{-2}$.

EXAMPLE 4

An aqueous mixture containing the following ingredients in the proportions indicated in % is prepared:

| | |
|---|---|
| Tapioca starch containing 88.7% dry matter and 18% amylose | 3.38 |

| -continued | |
|---|---|
| Polyoxyethylene sorbitan monostearate | 0.21 |
| Cyclamate | 0.082 |
| Saccharin | 0.008 |
| Citric acid | 0.30 |
| Yellow food colouring | 0.15 |
| Water | 95.72 |

To prepare this mixture, the starch is suspended in water and gelatinized for 30 mins. at 95° C. with careful stirring. A starch solution is obtained in which the quantity of amylose released from the granules is such it has an iodine binding power of 4.15%.

The remaining ingredients of the mixture are added to the starch solution at 95° C. and the mixture is vigorously stirred for 15 s. The amylose released is thus complexed with the emulsifier so that the starch has a degree of complexing of 100%.

The mixture is set by cooling to 25° C. without stirring. The lemon-flavoured gel obtained has a conservation modulus G' of 12 Nm$^{-2}$, a dissipation modulus G" of 3 Nm$^{-2}$ and a pH of 2.5. It is distinguished by a characteristic short gel texture.

By way of comparison, a product prepared in the same way, but with no addition of emulsifier, does not set, remains liquid and does not have the texture of a gel. Its conservation modulus G' is 0.8 Nm$^{-2}$ for a dissipation modulus G" of 1.2 Nm$^{-2}$.

We claim:

1. A process for preparing a gel composition comprising heating an aqueous mixture of a native starch and at least one emulsifier suitable for forming an inclusion complex with amylose, wherein the starch is in an amount of from 1% to 5% by weight starch dry matter and has an amylose content of from about 15% to about 30% by weight, at a temperature of from 90° C. to 125° C. for from 2 mins to 30 mins to gelatinize the starch, to release amylose from the starch, and to complex released amylose and said at least one emulsifier and then, cooling the heated aqueous mixture to gel the mixture.

2. A process according to claim 1 wherein the aqueous mixture contains milk.

3. A process according to claim 1 wherein the starch is in an amount of from about 3% to 5%.

4. A process according to claim 1 wherein the starch is in an amount below about 2% and wherein the aqueous mixture is heated at a temperature of from 90° C. to 98° C.

5. A process according to claim 1 wherein the aqueous mixture is heated so that the native starch releases amylose in an amount to provide an iodine binding power of approximately 3.3% to approximately 4.7%.

6. A process according to claim 1 wherein the at least one emulsifier is in an amount of from 1% to 8% by weight starch.

7. A process according to claim 1 wherein the emulsifier is selected from the group consisting of glycerol monostearate, calcium stearoyl lactyl-2-lactate, sodium stearoyl lactyl-2-lactate, polyoxyethylene sorbitan monostearate and polyethylene glycol monolaurate.

8. A process according to claim 1 wherein the aqueous mixture further contains ingredients for making a pudding.

9. A process according to claim 8 wherein the aqueous mixture contains milk solids.

10. A process according to claim 1 further comprising first treating the native starch with heat and moisture to obtain a treated native starch and then heating the treated native starch and emulsifier in aqueous mixture to complex the amylose.

11. The product of process claim 1.

12. A process for preparing a gel composition comprising heating an aqueous mixture of (a) gelatinized starch having an iodine binding power of approximately 3.3% to approximately 4.7% and (b) at least one emulsifier suitable for forming an inclusion complex with amylose to complex amylose with the at least one emulsifier and then, cooling the heated aqueous mixture to gel the mixture.

13. A process according to claim 12 wherein the aqueous mixture is heated at a temperature of from 70° C. to 125° C. for from 15 secs to 30 mins.

14. A process according to claim 12 wherein the starch is in an amount of from 1% to 5% by weight starch dry matter.

15. A process according to claim 14 wherein the aqueous mixture contains milk.

16. A process according to claim 12 wherein the at least one emulsifier is in an amount of from 1% to 8% by weight starch.

17. A process according to claim 12 wherein the emulsifier is selected from the group consisting of glycerol monostearate, calcium stearoyl lactyl-2-lactate, sodium stearoyl lactyl-2-lactate, polyoxyethylene sorbitan monostearate and polyethylene glycol monolaurate.

18. A process according to claim 12 wherein the aqueous mixture further contains ingredients for making a pudding.

19. A process according to claim 12 wherein the aqueous mixture contains milk solids.

20. The product of process claim 12.

21. A gel composition comprising an aqueous gel of a gelatinized starch wherein amylose is inclusion-complexed with an emulsifier and having a conservation modulus of from 5 Nm$^{-2}$ to 50 Nm$^{-2}$ and a dissipation modulus of from 1 Nm$^{-2}$ to 10 Nm$^{-2}$.

22. A gel according to claim 21 which contains milk solids.

23. A gel according to claim 21 wherein the gel is a pudding.

* * * * *